A. D. BAKER & O. GAIMAN.
SEPARATING MECHANISM FOR THRESHING MACHINES.
APPLICATION FILED FEB. 12, 1906.
905,134.
Patented Dec. 1, 1908.
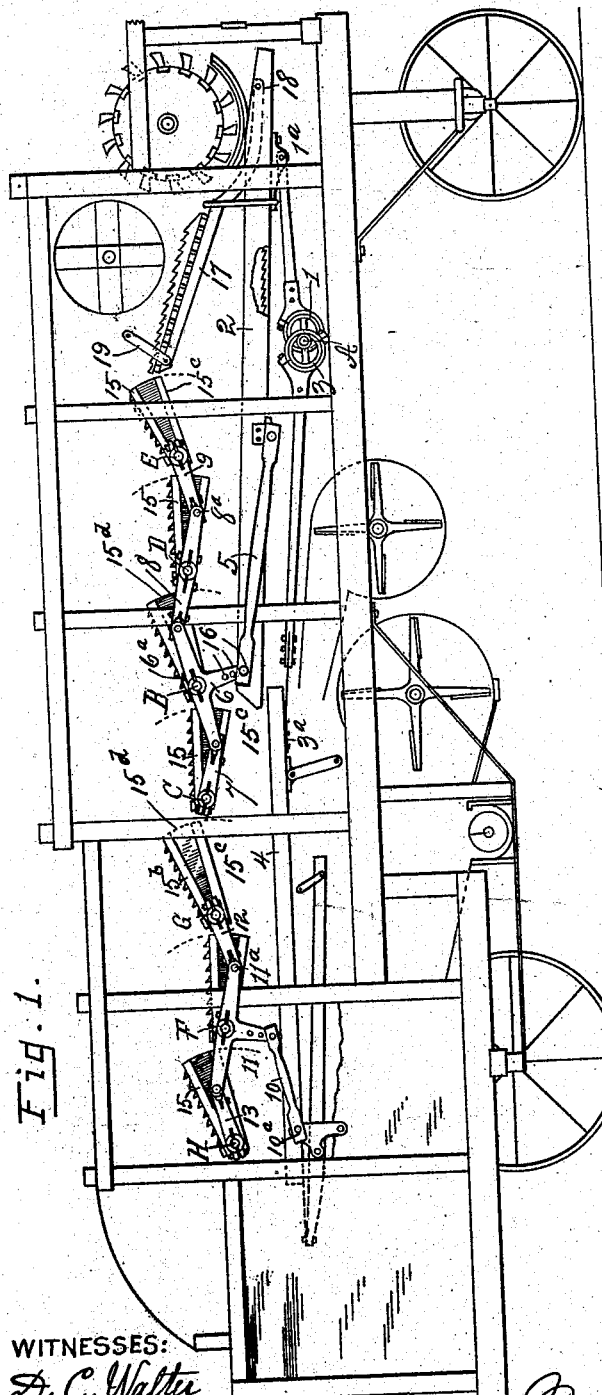
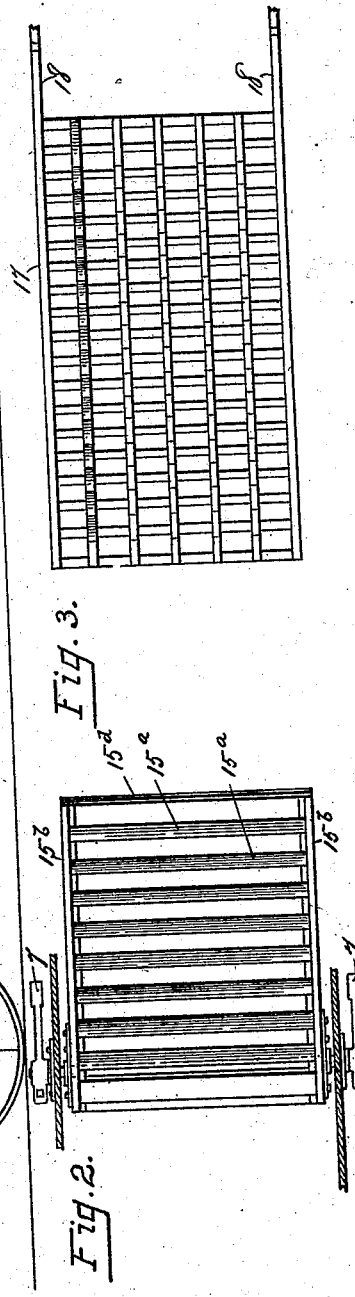
WITNESSES:
D. C. Walter
Ada Law
INVENTORS.
Abner D. Baker,
Otto Gaiman,
By Simon Hall, Atty.

UNITED STATES PATENT OFFICE.

ABNER D. BAKER AND OTTO GAIMAN, OF SWANTON, OHIO.

SEPARATING MECHANISM FOR THRESHING-MACHINES.

No. 905,134.   Specification of Letters Patent.   Patented Dec. 1, 1908.

Application filed February 12, 1906. Serial No. 300,609.

*To all whom it may concern:*

Be it known that we, ABNER D. BAKER and OTTO GAIMAN, citizens of the United States, residing at Swanton, in the county of Fulton and State of Ohio, have invented certain new and useful Improvements in Separating Mechanisms for Threshing-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The usual treatment of straw as it comes from the threshing cylinder of a threshing-machine, mixed with a large proportion of the grain, has been to agitate the straw for the separation of the grain by means of raddles or kindred devices. These devices have either shaken the straw to and fro or up and down and in some cases the straw has been rolled in a perforated cylinder. It is found in practice that these devices are unsatisfactory for the reason that an undue per cent. of grain is carried away and is lost in the straw discharged from the machine.

Our invention relates to and its object is to provide means for overcoming largely, if not entirely, the difficulty here indicated, and is designed to substitute for the movements heretofore employed in separators for the agitation of the straw the kind of motion that was so effectively used in tossing and turning the straw by hand when grain was threshed upon the old fashioned threshing floors. We attain these objects my means of the devices and construction hereinafter described and shown, and illustrated in the accompanying drawings, in which,—

Figure 1 is a side elevation of our machine; Fig. 2, a top-plan view of one of the racks or frames hereinafter referred to, and Fig. 3, a top-plan view of another of the racks hereinafter referred to.

Like numerals and letters of reference indicate like parts throughout the drawings.

Our machine is mounted on a stout wheeled-frame with inclosed sides, the threshing cylinder being located in the usual manner at the forward end, the threshed cleaned straw being discharged at the opposite end.

Our machine is provided with the usual or any preferred sieves, blowers, conveyers and the like which need not be here illustrated or described as they will be understood by those skilled in the art and as they form no part of the present invention.

In the drawings, A is a shaft journaled in the frame of the machine and driven by suitable connections with the shaft of the cylinder or otherwise. On the shaft A is a cam 1 carrying a cam and cam-rod pivotally connected, as at $1^a$, with grain-pan 2, mounted and adapted to reciprocate in the frame of the machine. Upon the shaft A is another cam 3 carrying a cam and cam-rod connected, as at $3^a$, to grain-pan 4. The cams 1 and 3 are oppositely disposed so that the two grain-pans 2 and 4 are moved in opposite directions.

5 is a connecting rod pivotally connected at one end to the grain-pan 2 and at its other end pivotally connected to the downwardly projecting extremity of T-shaped lever 6. This lever is secured by means of grip-bolts $6^a$ to shaft B which forms for the lever a fulcrum located at the meeting points of its three arms. One extremity of the cross-arm of the lever 6 is slidably engaged with one extremity of lever 7 the other end of which is clamped and fulcrumed upon shaft C, journaled in the frame of the machine. The other extremity of the cross-arm of lever 6 is in like manner engaged with one end of lever 8, clamped and fulcrumed at its middle upon shaft D, journaled in the frame of the machine. The opposite end of the lever 8 is slidably engaged, as at $8^a$, with the extremity of lever 9, clamped and fulcrumed upon shaft E, journaled in the frame of the machine.

10 is a connecting rod pivoted at one end to the grain-pan 4, as at $10^a$, and at its other end to the lower extremity of the T-shaped lever 11. This lever is clamped and fulcrumed upon shaft F at the meeting point of the three arms of the lever. One end of the cross-arm of this lever is slidably connected, as at $11^a$, with lever 12, clamped upon shaft G, journaled in the frame of the machine. The opposite end of the cross-arm of the lever 11 is in like manner engaged with the extremity of lever 13, clamped and fulcrumed upon shaft H, journaled in the frame of the machine. The shafts which support the several levers here referred to project through the sides of the machine and the levers are mounted on the ends of the shafts on the outer side of the machine. In Fig. 1, but one series of levers appears and we have thus far only described one series or set of levers, but it should be understood that the levers, connecting rods, and shafts are duplicated and are the same at both sides of the machine.

Upon each of the shafts from B to H inclusive is clamped one edge of a rack or frame 15. These racks or frames being all alike, a description of one will suffice. The top of the frame or rack is flat and consists of a series of bars 15$^a$, preferably angular in cross-section, secured at their ends to side-pieces 15$^b$. Beneath and in the same plane with the pieces 15$^b$ are like pieces 15$^c$ arranged at an angle to the part 15$^b$. The parts 15$^b$ and 15$^c$ nearly meet at one end and are clamped by means of gripping-bolts or otherwise upon the shaft to which they belong. The diverging extremities of the parts 15$^b$ and 15$^c$ are covered by a curved strip of sheet metal 15$^d$ which closes the edge of the rack or frame 15 opposite its shaft. The frame or rack here described is an openwork frame through which grain may fall onto the grain tables or pans beneath, the edge of the frame farthest from the threshing cylinder being secured, in each instance, to the shaft to which the rack belongs, the opposite edge of the rack being broadened vertically, the broadened end being closed by a curved strip of sheet metal forming a straw-guard or apron. The rack is, in outline, substantially a segment of a cylinder. Each of the racks or frames, being gripped upon its shaft by gripping-bolts, may be adjusted upon its shaft as may be required. Each of the levers upon the extremities of these shafts, being gripped in place, may be adjusted in relation to the shaft as may be desired. The several frames or racks, by way of illustration, seven in number, may be regarded as of two series composed respectively of alternate racks or frames. The adjustment and arrangement of these two series is such that when one set swings upwardly, the other set swings downwardly, the two alternating sets moving constantly in opposite directions. By means of adjusting holes 16 in the downwardly projecting arms of the levers 6 and 11, the point of connection with the driving-rods 5 and 10 may be changed so that the swing or throw of these levers and the resulting swing of the remaining levers may be varied as may be required.

17 is a raddle the side members of which are pivoted, as at 18, to the grain-pan 2, the opposite end being supported by hangers 19. The raddle 17 is disposed next to the threshing cylinder and has an upward and rearward motion which carries the straw onto the first of the series of racks or frames 15.

The operation of our machine is as follows: Assuming that the machine is in motion and that straw mixed with grain is fed onto the top of the first rack 15,—this rack now swings upwardly and tosses the straw with a whirling motion onto the second rack 15 which, when the first rack is at the top of its swing, is at the bottom of its swing. Now the second rack swings upwardly and again tosses the straw forward onto the third rack which in turn passes it along in the same manner from rack to rack until the straw is discharged at the rear end of the machine. Thus a constant stream of straw is passed along from one rack to another, each upward movement of each of the racks tossing the straw and turning it over so that all the grain is shaken out of the straw and allowed to drop down through the open frames onto the grain tables, from whence the grain passes to the usual cleaning devices. By means of the adjustment above described, the swing of the arms and racks may be made as great or small as the conditions may require. It will be seen that the curved closures 15$^d$ of the edges of the racks 15 swinging in an arc close to its neighboring rack prevent the straw from passing beneath or between the racks instead of on top as described.

Having described our invention, what we claim and desire to secure by Letters Patent is,—

1. In a device of the described character, a frame, a threshing cylinder mounted at the forward end of the frame, the space between the sides of the frame forming a straw-way leading from the forward end of the machine to its discharge end, a series of racks disposed transversely of said straw-way and extending respectively entirely across said straw-way, a pivotal support for each of said racks disposed at the side of the rack toward the discharge end of the straw-way, and means for swinging the adjacent racks in said series in opposite directions.

2. In a device of the described character, a frame, a threshing cylinder mounted at the forward end of the frame, the space between the sides of the frame forming a straw-way leading from the forward end of the machine to its discharge end, a series of racks disposed transversely of said straw-way and extending respectively entirely across said straw-way, a pivotal support for each of said racks disposed at the side of the rack toward the discharge end of the straw-way, means for swinging the adjacent racks in said series in opposite directions, and a depending straw-guard secured to the forward side of each of said racks.

In testimony whereof we affix our signatures in presence of two witnesses.

ABNER D. BAKER.
OTTO GAIMAN.

Witnesses:
P. M. BRAILEY,
ADA LAW.